Figure 1:
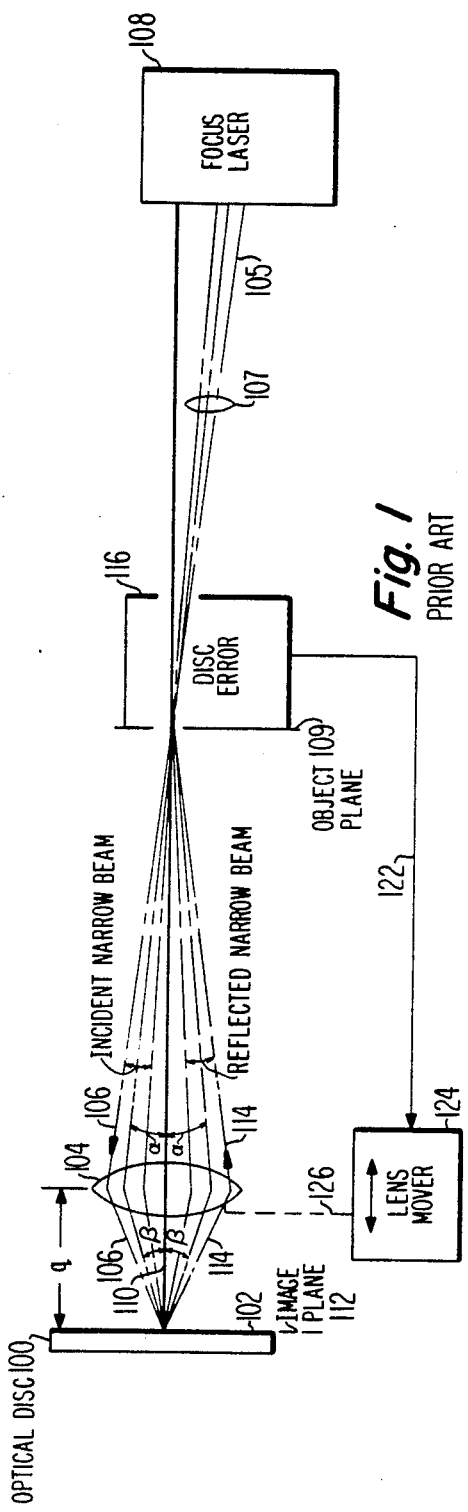

United States Patent [19]

Reno

[11] Patent Number: 4,590,594

[45] Date of Patent: May 20, 1986

[54] SIDE-SPOT FOCUS APPARATUS FOR OPTICAL DISC RECORDING AND/OR PLAYBACK SYSTEM

[75] Inventor: Charles W. Reno, Cherry Hill Township, Camden County, N.J.

[73] Assignee: RCA Corporation, Princeton, N.J.

[21] Appl. No.: 554,729

[22] Filed: Nov. 23, 1983

[51] Int. Cl.⁴ .............................................. G11B 7/00
[52] U.S. Cl. ........................................ 369/45; 250/201
[58] Field of Search ..................... 358/342; 369/43, 44, 369/45, 46; 250/201 DF

[56] References Cited

U.S. PATENT DOCUMENTS 4,142,209  2/1979  Hedlund et al. .
4,301,527  11/1981  Tsunoda et al. ....................... 369/45
4,374,324  2/1983  Rosmalen et al. ................. 369/45 X
4,425,043  1/1984  Rosmalen ......................... 369/45 X Primary Examiner—Robert L. Richardson
Attorney, Agent, or Firm—Joseph S. Tripoli; George E. Haas; George J. Seligsohn

[57] ABSTRACT

Focus error due to drift from a specified value of the pointing angle of a focus laser light beam with respect to the reflective surface of an optical disc is self-compensated by employing two light beams derived from the same focus laser that have a substantially constant angular displacement therebetween. Any change due to drift in the specified value of the pointing angle of one light beam is accompanied by a substantially equal and opposite change due to drift in the specified value of the pointing angle of the other light beam.

6 Claims, 7 Drawing Figures

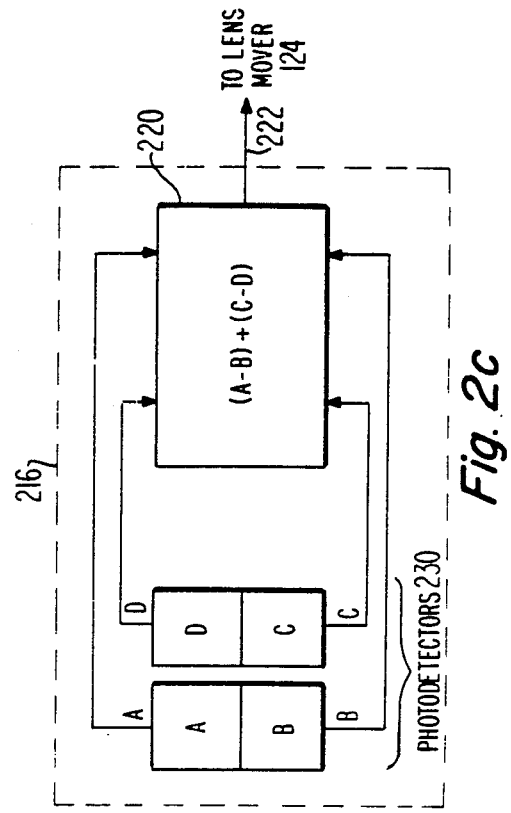
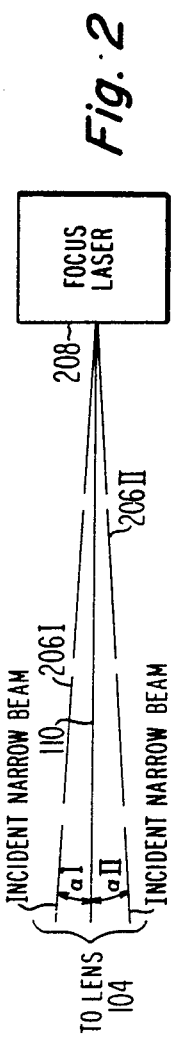
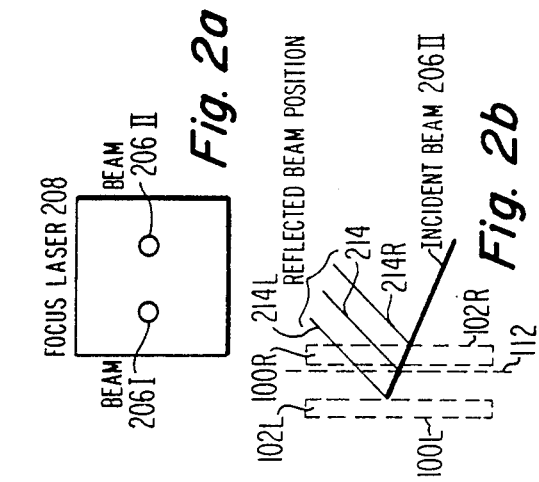

SIDE-SPOT FOCUS APPARATUS FOR OPTICAL DISC RECORDING AND/OR PLAYBACK SYSTEM

The Government of the United States of America has rights in this invention pursuant to a Government contract.

This invention relates to an improved side-spot focus apparatus for an optical disc recording and/or playback system.

As known in the art, an optical disc is capable of extremely high density storage of information. An example of an optical disc recording and playback system is disclosed in U.S. Pat. No. 4,142,209, which issued Feb. 27, 1979 to Hedlund, et al. Such a system employs a relatively high-power laser beam for recording information on the optical disc and a relatively low-power beam for reading information from the optical disc. In both cases, it is essential that the laser beam be precisely focused on the reflective surface of the optical disc. Further, precise focusing must be maintained despite relative motion of the disc with respect to the record and/or read beams which occur in addressing different regions of the disc. In order to maintain this precise focusing, optical disc recording and/or playback systems incorporate some type of focus apparatus. One particular type of focus apparatus, known in the art, is side-spot focus apparatus. Side-spot focus apparatus employs an auxiliary laser light beam, which is directed toward the reflective surface of the optical disc at a specified pointing angle. Present-day side-spot focus beam apparatus ignores the fact that the pointing angle of the auxiliary laser beam drifts somewhat in response to such factors as aging of the laser, temperature of the laser, etc. This drift causes a small but still significant focus error with which present-day side-spot focus beam apparatus cannot deal. The advantage of the improved side-spot focus apparatus of the present invention is that it is self-compensating for focus error due to drift in the value of the pointing angle of the laser beam.

More specifically, the improved side-spot focus apparatus of the present invention comprises first means including a focus laser for deriving first and second separate collimated light beams respectively traveling toward a light-reflective surface of the optical disc in a first beam direction and in a second beam direction. Each of the first and second beam directions have a projected component thereof oriented parallel to a given plane, which given plane is oriented perpendicular to the light-reflective surface. The projected component of the first beam direction in the given plane is oriented at a first oblique angle $\alpha_I$ with respect to and on a given side to the normal of a disc surface. The projected component of the second beam direction in the given plane is oriented at a second oblique angle $\alpha_{II}$ with respect to and on the side opposite from the given side of said normal to said disc surface. Further, $\alpha_I$ has a non-constant value equal to C plus or minus a pointing error $\Delta$ and $\alpha_{II}$ has a non-constant value C minus or plus the pointing error $\Delta$, but the sum of $\alpha_I + \alpha_{II}$ has a substantially fixed constant value equal to 2C.

The improved side-spot focus apparatus of the present invention further comprises second means including an imaging lens having its optical axis oriented substantially parallel to said given normal, the imaging lens being situated between the first means and the disc surface in the path of the first and second beams for illuminating the reflective surface of the disc with incident image first and second beams. Each of the incident image first and second beams is focused on the disc surface only when the distance between the surface and the imaging lens has a given value.

The improved side-spot focus apparatus of the present invention still further comprises third means including a set of photodetectors, responsive to the reflective positions of each of the first and second beams reflected from the disc surface and passed back through the imaging lens, for deriving an error signal that is dependent on the difference between the actual value of the distance from the imaging lens to the disc surface and the given value thereof and is independent of the pointing error $\Delta$.

Finally, the improved side-spot focus apparatus of the present invention comprises fourth means including a lens mover responsive to the error signal for moving the imaging lens in the direction to minimize the difference between the actual value and given value of the distance from the imaging lens to the disc surface.

IN THE DRAWING

Figure 1A:
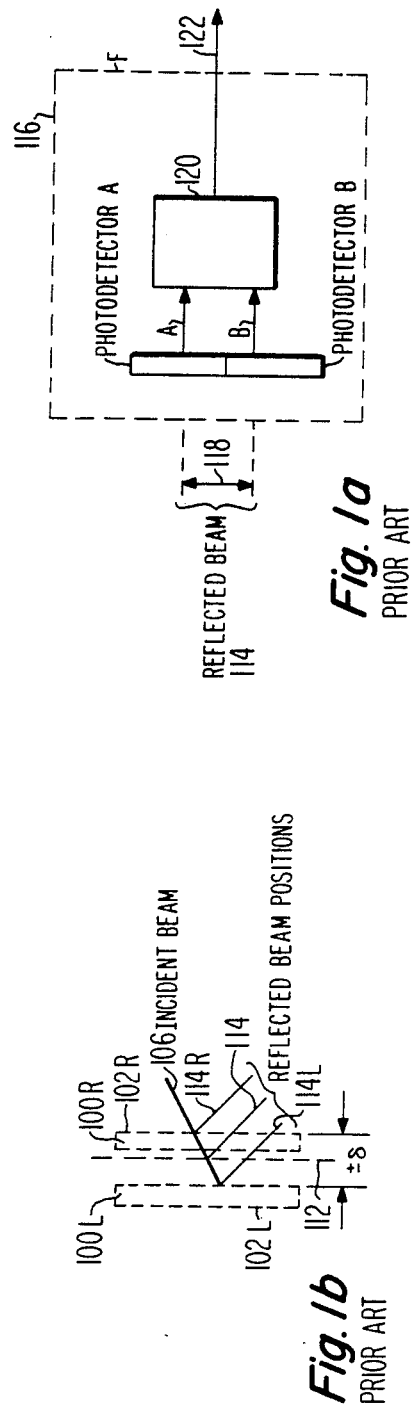
Figure 1B:
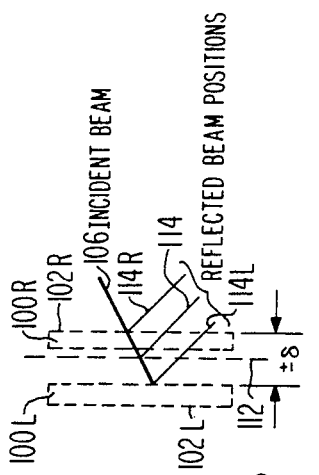

FIGS. 1, 1a and 1b schematically illustrate the structure and operation of a typical prior art side-spot focus apparatus for an optical disc recording and/or playback system; and FIGS. 2, 2a, 2b and 2c schematically illustrate the structure and operation of an improved side-spot focus apparatus for an optical disc recording and/or playback system incorporating the principles of the present invention.

Referring to FIG. 1, there is shown optical disc 100 having a light-reflective surface 102. Situated at a distance q from light-reflective surface 102 is imaging lens 104. (Note: For this description, lens 104 is a finite conjugate lens; a lens with real image and object planes.) Originally collimated beam of light 105, from focus laser 108, is preferably passed through lens 107 to derive incident narrow beam 106 having a crossover in object plane 109 of imaging lens 104. Beam 106 is inclined, in the plane of the paper, at a relatively small oblique angle $\alpha$ with respect to the normal 110 to the reflective surface 102 of optical disc 100. Focus laser 108 could be either further to the right or further to the left so long as the pointing angle $\alpha$ of beam 106 has a certain specified value and the crossover of beam 106 remains in object plane 109.

After refraction by imaging lens 104, beam 106 is incident on the light-reflective surface 102 at an angle of incidence $\beta$ with respect to normal 110. In FIG. 1, surface 102 is shown as coinciding with image plane 112 of imaging lens 104. This is the desired relative position of disc 100 with respect to imaging lens 104. That is, if the distance q has that given value shown in FIG. 1, image plane 112 will coincide with reflective surface 102 and incident beam 106 will be focused on surface 102.

Reflection from surface 102 forms reflected narrow beam 114 having an angle of reflection $\beta$ equal to the angle of incidence $\beta$ of beam 106 incident on reflective surface 102. However, after being passed back through imaging lens 104, which transforms the value of the angle of reflection of beam 114 from $\beta$ back to $\alpha$, assuming that reflective surface 102 coincides with imaging plane 112 as indicated in FIG. 1, the reflected beam 114 is imaged to a small spot that impinges on a pair of photodetectors included in disc error detector 116, since the photodetectors are effectively positioned in object plane 109, as shown in FIG. 1. (In practice, a reflected-beam beam splitter, not shown, is situated before detector 116, so as to permit the physical location of detector 116 to be removed from the path of incident beam 106). The distance to the disc error detector is adjusted only by changes in the length of the long conjugate design of the lens 104.

The structure of disc error detector 116, shown in FIG. 1a, includes a pair of contiguous photodetectors A and B, which derive respective signals A and B that correspond in value to the intensity of illumination of the respective photodetectors by reflective narrow focused beam 114 (which has a narrow beam width 118). Respective signals A and B are applied as inputs to an error circuit 120 that produces as an output error signal 122 having a value corresponding to A-B.

Lens mover 124, which is mechanically coupled to imaging lens 104 by link 126, has error signal 122 applied as a control input thereto. Lens mover 124, which may comprise a loud speaker drive, is capable of moving imaging lens 104 with sub-micrometer precision to the left toward optical disc 100 or to the right away from optical disc 100 in acccordance with the polarity of the applied A-B error signal 122. This causes the value of the distance q from the reflective surface 102 of optical disc 100 to imaging lens 104 to be substantially maintained at that given value at which image plane 112 coincides with surface 102, despite small changes in the absolute position of optical disc 100.

Any sub-micrometer increase $\delta$ in the value of the imaging distance q results in reflective surface 102 of disc 100 moving to the left of image plane 112 (as indicated by 100L and 102L in FIG. 1b). Any sub-micrometer decrease $-\delta$ in the value of the imaging distance q causes reflective surface 102 of disc 100 to move to the right of image plane 112 (as indicated by 100R and 102R in FIG. 1b). Further, as indicated in FIG. 1b, the beam position of the reflected beams varies in accordance with the value of $\delta$, although the angle of incidence of incident beam 106 is independent of the value of $\delta$. In particular, as shown in FIG. 1b, the position of reflected beam 114L (reflected from the reflective surface 102L to the left of image plane 112) and the position of reflected beam 114R (reflected from the reflective surface 102R to the right of image plane 112) can move respectively below and above the position of reflected beam 114 from image plane 112 (when the image distance Q has its proper given value shown in FIG. 1). This occurs because the image of the input spot near the detector moves longitudinally along the axis. The centioid of the beam at the detector, thus, is displaced by $\approx 2\alpha M^2 \delta$, where M is the magnification of the system.

As discussed above in connection with FIGS. 1 and 1a, the reflected beam, after passing back through imaging lens 104, is incident on photodetectors A and B, shown in FIG. 1a. Beam width 118 of the reflected beam is symetrically situated with respect to photodetectors A and B only when the reflected beam originates from image plane 112. Because of the inverting effect of an imaging lens, lower positioned reflected beam 114L illuminates photodetector A with more intensity than it does photodetector B and upper positioned reflected beam 114R illuminates photodetector B with more intensity than it does photodetector A. Lens mover 124, in response to the A-B error signal on the output 122 applied thereto from disc error detector 116, mechanically moves imaging lens 104 through mechanical link 126 in a direction to minimize the value of $\delta$ (shown in FIG. 1b). Thus, the distance q between optical disc 100 and imaging lens 104 is restored to its given value at which reflective surface 102 coincides with image plane 112. In this manner, the spot of light incident on reflective surface 102 is retained in focus.

The proper operation of the prior-art side-spot focus apparatus shown in FIGS. 1, 1a and 1b is predicated on the assumption that the pointing angle $\alpha$ has a specified fixed value that remains constant under all conditions. However, the fact is that the value of the pointing angle $\alpha$ drifts slightly ($\pm \Delta$) from its specified value in accordance with such factors as the temperature of the focus laser, aging of the focus laser, etc. The effect of this drift is to shift the position of the reflected beam impinging on photodetectors A and B, thereby resulting in a spurious error signal. The spurious error signal causes erroneous changes in the value of the distance q, thereby defocusing the light spot incident on the reflective surface of the optical disc.

Modification of the structure and operation of the the prior art side-load apparatus shown in FIGS. 1, 1a and 1b in the manner shown in FIGS. 2, 2a, 2b and 2c provides an improved side-spot focus apparatus that self compensates for the drift error $\Delta$ in the value of the pointing angle. More particularly, the improved side-spot focus apparatus of the present invention includes optical disc 100, imaging lens 104, lens mover 124 and mechanical link 126 arranged substantially as shown in FIG. 1. However, focus laser 208 differs from focus laser 108 of FIG. 1 by deriving from a single laser, two angularly-displaced incident narrow collimated beams $206_I$ and $206_{II}$ (only the center-lines of which are shown in FIG. 2), rather than a single incident narrow beam 106. The first beam direction $206_I$ (which corresponds in function to single beam 106 of FIG. 1) has a projected component thereof oriented parallel to the plane of the paper. Similarly, the second beam direction of beam $206_{II}$ has a projected component thereof oriented parallel to the plane of the paper. As indicated in FIG. 2, the projected component of the first beam direction of beam $206_I$ in the plane of the paper is oriented at a first oblique angle $\alpha_I$ with respect to and on a given side of normal 110 to the surface of optical disc 100. The optical axis of imaging lens 104 is preferably substantially coincident with normal 110. In any case, the optical axis of imaging lens 104 is oriented substantially parallel to normal 110.

The projected component of the second beam direction of beam $206_{II}$ in the plane of the paper is oriented at a second oblique angle $\alpha_{II}$ with respect to and on the opposite side from the given side of normal 110.

Focus laser 208 includes such means as beam splitters, mirrors, etc. for deriving beams $206_I$ and $206_{II}$ with an angular displacement therebetween of substantially $\alpha_I + \alpha_{II}$ having a fixed constant value equal to 2C. C is the specified angular value of each of the upper pointing angle $\alpha_I$ and the lower pointing angle $\alpha_{II}$. However, in fact, each of pointing angles $\alpha_I$ and $\alpha_{II}$ is likely to have a pointing error $\Delta$. Therefore, $\alpha_I$ has a non-constant value equal to $C \pm \Delta$ and $\alpha_{II}$ has a non-constant value $C \pm \Delta$ (since the sum of the two angles has a substantially fixed constant value equal to 2C).

Incident beam $206_I$ performs in the same manner as single incident beam 106, discussed above, to provide reflected beam positions of the type shown in FIG. 1b. It is essential that the reflected beam derived from incident beam $206_I$ be separated from incident beam $206_{II}$ in order to remain distinct. Therefore, as shown in FIG.

2a, respective beams 206$_I$ and 206$_{II}$, emerging from focus laser 208, are displaced from one another in a direction perpendicular to the plane of the paper in the view shown in FIG. 2. Specifically, in the preferred embodiment shown in FIG. 2, each of beams 206$_I$ and 206$_{II}$ actually lies in a separate plane that is parallel to the plane of the paper. However, this particular arrangement is not essential in order to maintain beams 206$_I$ and 206$_{II}$ distinct. Alternatively, for instance, each of beams 206$_I$ and 206$_{II}$ could lie in a separate plane that is angularly displaced from the plane of the paper so long as that beam travels in a direction toward disc 100 and has a projected component lying in the plane of the paper, in the view shown in FIG. 2. Otherwise, angular displacement of the beams with respect to the plane of the paper, in the view shown in FIG. 2, is immaterial to the operation of the present invention.

FIG. 2b, which corresponds to FIG. 1b, shows the reflected beam position derived from beam 206$_{II}$. As indicated in FIG. 2b, reflected beam position 214L, 214 and 214R, derived from incident beam 206$_{II}$ traveling in an opposite direction (up) from the direction (down) from the reflected beam position (shown in FIG. 1b) derived from incident beam 206$_I$.

Disc error detector 216, shown in FIG. 2c, includes a set of photodetectors 230 and error circuit 220. The set of photodetectors 230 includes a first pair of photodetectors A and B and a second pair of photodetectors C and D. The first pair of photodetectors A and B, which correspond with photodetectors A and B of FIG. 1a, is situated in the path of the reflected narrow beam derived from incident beam 206$_I$. The second pair of photodetectors C and D is situated in the path of the reflected narrow beam derived from incident beam 206$_{II}$. Photodetectors A, B, C and D derive respective signals A, B, C and D therefrom, each of which has a value in accordance with the intensity of light impinging on that one of the set of photodetectors 230 with which that signal corresponds. Each of signals A, B, C and D is applied as an individual input to error circuit 220. As indicated in FIG. 2c, error circuit 220 derives an error signal 222, which is applied to lens mover 124, having a value in correspondence with (A−B)+(C−D).

Based on the foregoing discussion of FIG. 1b and FIG. 2, it is apparent that the relative intensities with which each of photodetectors A and B of the first pair are illuminated by the reflected beam derived from incident beam 206$_I$ depend both on the relative position of reflecting surface 102 with respect to image plane 112 and the actual value to the pointing angle $\alpha_I$ in the following manner:

Based on the foregoing discussion of FIGS. 1, 1a, 1b and 2, it is apparent that movement of disc 100 to the left increases the intensity of illumination of photodetector A with respect to that of photodetector B. In a similar manner, a decrease in the value of the pointing angle $\alpha_I$ results in a decrease in the intensity of illumination of photodetector A with respect to that of photodetector B. Based on the foregoing discussion of FIGS. 2, 2a, 2b and 2c, it is apparent that photodetector C of the second pair corresponds in function to photodetector A of the first pair and that photodetector D of the second pair corresponds in function to photodetector B of the first pair with respect to changes in the position of reflective surface 102 with respect to image plane 112. Furthermore, the sum of $\alpha_I$ and $\alpha_{II}$ remains substantially constant. Any change in the value of the pointing angle $\alpha_I$ must be accompanied by a substantially equal and opposite change in the value of pointing angle $\alpha_{II}$. Therefore, any change in the relative intensity of illumination of photodetector A with respect to photodetector B is accompanied by a substantially equal and opposite change in the intensity of illumination of photodetector C with respect to photodetector D. For this reason, the value of the (A−B)+(C−D) error signal 222 derived from error circuit 220 is substantially independent of any error Δ in the pointing angle because any change in the value of (A−B) is self compensated for by an equal and opposite change in the value of (C−D).

On the other hand, the respective values of both (A−B) and (C−D) are increased by displacement of reflective surface 102 to the left of image plane 112 and decreased by displacement to the right of image plane 112. Therefore, the double-beam disc error detector 216 of the improved side-spot focus apparatus of the present invention is substantially twice as sensitive as is the single beam disc error detector 116 of the prior art side-spot focus apparatus of FIGS. 1 and 1a.

What is claimed is:

1. An improved side-spot focus apparatus for an optical disc recording and/or playback system that includes an optical disc having a light-reflective surface oriented perpendicular to a given plane; said apparatus comprising:

first means including a focus laser for deriving first and second separate light beams respectively traveling toward said surface in a first beam direction and in a second beam direction, each of said first and second beam directions having a projected component thereof oriented parallel to said given plane, said projected component of said first beam direction in said given plane being oriented at a first oblique angle $\alpha_I$ with respect to and on a given side of a normal to said disc surface, said projected component of said second beam direction in said given plane being oriented at a second oblique angle $\alpha_{II}$ with respect to and on the side opposite from said given side of said normal to said disc surface, wherein $\alpha_I$ has a non-constant value equal to C plus or minus a pointing error Δ and $\alpha_{II}$ has a non-constant value C minus or plus said pointing error Δ, but the sum of $\alpha_I$ plus $\alpha_{II}$ has a substantially fixed constant value equal to 2C;

second means including an imaging lens having its optical axis oriented substantially parallel to said given normal, said imaging lens being situated between said first means and said disc surface in the path of said first and second beams for illuminating said reflective surface of said disc with incident imaged first and second beams, each of said incident imaged first and second beams being focused on said disc surface only when the distance between said surface and said imaging lens has a given value;

third means including a set of photodetectors, responsive to the respective positions of each of said imaged first and second beams reflected from said disc surface and passed back through said imaging lens, for deriving an error signal that is dependent on the difference between the actual value of the distance from said imaging lens to said disc surface and said given value thereof and is independent of said pointing error Δ; and fourth means including a lens mover responsive to said error signal for moving said imaging lens in a direction to minimize said difference between the actual value and given value of the distance from said imaging lens to said disc surface.

2. The apparatus defined in claim 1, wherein each of said first and second beams lies in a plane substantially parallel to said given plane.

3. The apparatus defined in claim 1, wherein said first means derives from said focus laser first and second beams that are displaced from one another in a direction perpendicular to said given plane.

4. The apparatus defined in claim 3, wherein said first beam lies in a first plane substantially parallel to said given plane and said second beam lies in a second plane substantially parallel to said given plane that is displaced from said first plane in a direction perpendicular to said given plane.

5. The apparatus defined in claim 1, wherein:
said set of photodetectors is comprised of a first pair of contiguous photodetectors differentially illuminated by said reflected first beam in accordance with the position of said reflected first beam for deriving respective signals A and B in accordance with the relative intensity of illumination of said respective photodetectors of said first pair, and a second pair of contiguous photodetectors differentially illuminated by said reflected second beam in accordance with the position of said reflected second beam for deriving respective signals C and D in accordance with the relative intensity of illumination of said respective photodetectors of said second pair;
said respective photodetectors of said first pair and said second pair being so positioned with respect to one another that a change in the distance from said imaging lens to said disc surface that results in signal A increasing relative to signal B also results in signal C increasing relative to signal D; and
said third means further includes means responsive to signals A, B, C and D for deriving an error signal having a value corresponding to $(A-B)+(C-D)$.

6. The apparatus defined in claim 1, wherein said imaging lens optical axis substantially coincides said given normal.

* * * * *